Jan. 10, 1967    C. L. METZLER ETAL    3,297,167
MULTI-ASPECT DISPAY DEVICE

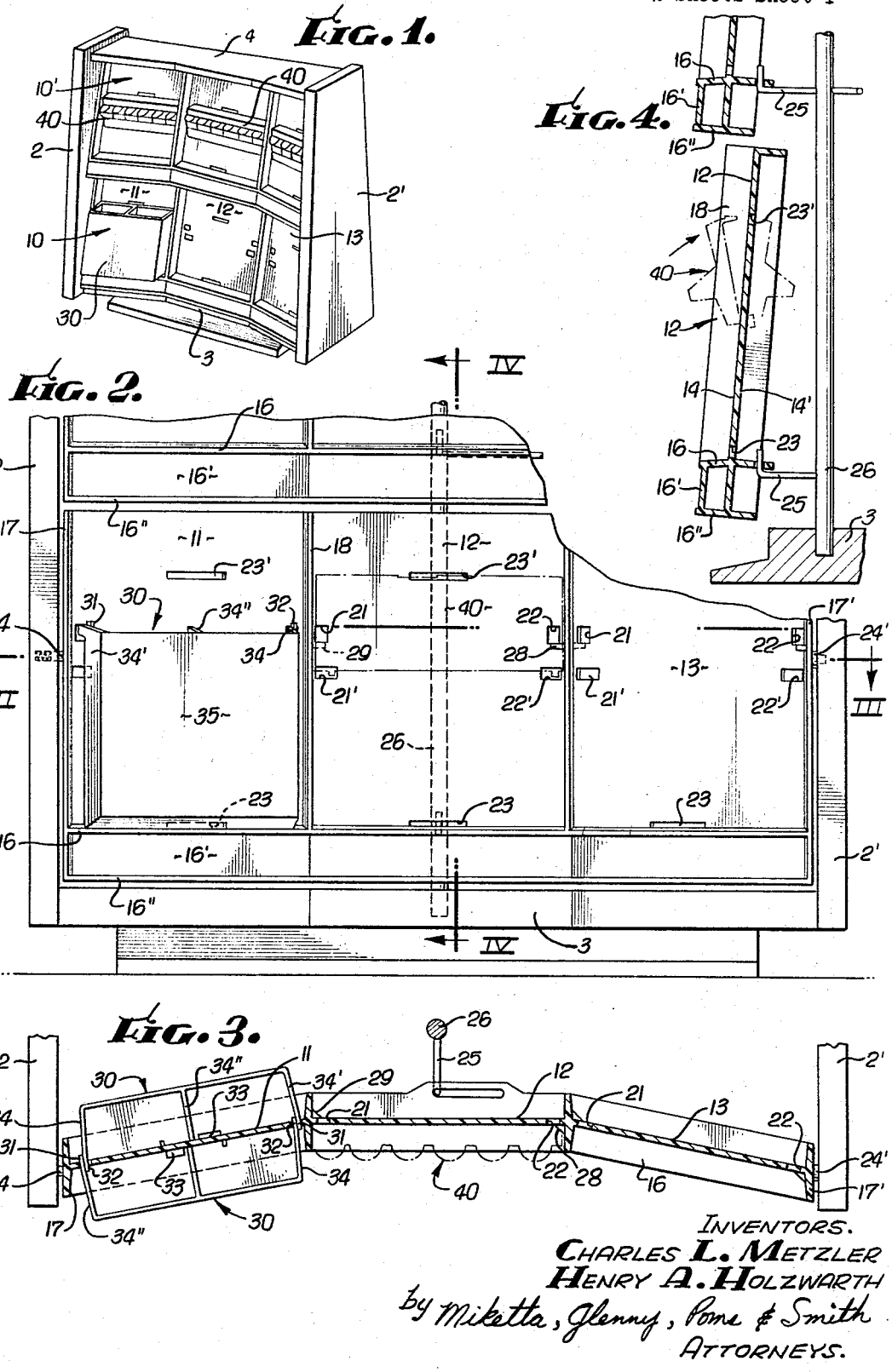

Filed Jan. 4, 1965    2 Sheets-Sheet 2

INVENTORS.
CHARLES L. METZLER
HENRY A. HOLZWARTH
by Miketta, Glenny, Poms & Smith
ATTORNEYS.

United States Patent Office 3,297,167
Patented Jan. 10, 1967

3,297,167
MULTI-ASPECT DISPLAY DEVICE
Charles L. Metzler, Alpine, N.J., and Henry A. Holzwarth, Bayside, N.Y., assignors to Paper Mate Manufacturing Company, Santa Monica, Calif., a corporation of Delaware
Filed Jan. 4, 1965, Ser. No. 423,097
11 Claims. (Cl. 211—69)

This invention relates to an improved, versatile, convertible display device arranged for assembly from standardized components whereby displays differing in appearance and capable of exhibiting different articles may be obtained, thereby creating purchaser interest.

The display of articles to prospective purchasers must be eye arresting, attractive and periodically varied in order to create the necessary difference which draws attention to the display. Although a display rack may be utilitarian, its protracted use engenders the familiarity in the eye of the beholder which greatly reduces the sales promotional value of the display. The cost of completely rebuilding display cases and racks is prohibitive. The present invention is directed to a display construction or assembly utilizing standard, interchangeable components whereby a sequence of displays differing in appearance may be quickly assembled from such components, thereby continuing and revitalizing the eye arresting, effective display. Moreover, the display assembly of the present invention makes the articles readily visible to the prospective customer in an orderly array in which the articles may be both seen and touched, but preferably not removable from the display until a sales person or attendant makes the removal of the articles possible. This discourages and minimizes pilfering.

The display device of the present invention is therefore flexible in that the various components are provided with cooperating means so that they can be combined with a panel in different positions thereby producing finished displays of different capacity, appearance and arrangement. Moreover, the components may be designed to handle different articles, thereby permitting the user of the display to modify it very quickly so as to present either different models or different articles.

An object of the present invention is to disclose and provide a readily adjustable and changeable display device. Although the display construction hereafter described in detail is capable of being used for a great variety of articles, particular attention will be drawn to the utilization of the display in the presentation and merchandizing of writing instruments, ink cartridges and similar allied articles.

Another object of the invention is to disclose and provide a display construction utilizing standardized elements capable of being interchangeably used with display panels.

A still further object of the invention will be to disclose and provide elements, components and constructional details relating to effective and economical display or merchandising devices.

These and various other objects, advantages and modifications of the present invention will be readily appreciated from the description given hereinafter.

For purposes of illustration, reference will be had to the appended drawings in which:

FIG. 1 is a perspective view of one form of display assembly embodying the present invention.

FIG. 2 is a somewhat enlarged front view of one exemplary panel of the type employed in the device of FIG. 1.

FIG. 3 is a horizontal section of the panel illustrated in FIG. 2, the section being taken along plane III—III, this figure indicating display components attached to the panel.

FIG. 4 is a vertical section taken along plane IV—IV of FIG. 2, illustrating panel locking means and the relationship of panels in pilferproof position. The attachment of display components is shown in dash lines.

Figure 9:
FIGS 9, 9a and 9b are diagrammatic representations in horizontal section of various forms of panels capable of being used in the manner herein disclosed.

One form of completely assembled display device illustrated in FIG. 1 embodies an outer supporting frame having side members 2 and 2', a bottom member 3 (shown with a supporting foot) and a top member 4. Carried by this frame are panels 10 and 10' on which are mounted various holder components 30 and pen rack components 40. Writing instruments are held in aligned, parallel array in the pen rack components and other articles such as ink cartridges or writing tablets may be held for display and sales purposes in the holder components 30. It will be noted that in the form shown, the display assembly presents a concave appearance and a number of articles, thereby permitting the prespective customer to observe a large number of articles very easily and facilitating selection of articles from such array.

The enlarged front view of a single panel 10, shown in FIG. 2, shows that such unitary panel is divided into panel areas 11, 12, and 13, which are angularly related. Each of these panel areas has a frontal surface 14 and a rear surface 14'. These panel areas are held in fixed angularly related relationship by means of a lower flanged structure including the flange 16 and, when desired, a web 16' and an outer lip 16", which is parallel to the flange 16. The outer surface of the web 16' may carry suitable prices, advertising, descriptive matters or the like. A continuous, rearwardly extending lip at the top of the panel areas strengthens the panels.

Outstanding ribs 17 and 17' constitute an outer flange along the vertical margins of panel areas 11 and 13; outstanding ribs 18 and 18' delineate the vertical margins spacing the panel areas from each other. These various ribs impart rigidity to the panel areas. The entire panel may be prefabricated from a plastic composition.

Each of the panel areas 11, 12 and 13 is provided with a plurality of attachment ports or apertures and locking slots capable of cooperating with elements of holder components, pen rack components and other article holding components which may be selectively connected to the panel areas. Each panel area includes a pair of attachment ports or apertures adjacent the ribs delineating said areas; for example, panel area 12 has a pair of apertures 21 and 21' adjacent one rib and apertures 22 and 22' adjacent the other. In addition, each panel area includes a locking slot located below the ports as at 23 and another locking slot located above said port, as at 23'. These last named locking slots are preferably relatively long, horizontally disposed and centrally located. It may be stated at this time that ports or apertures 21 and 22 are adapted to receive hinge lugs and a portion of slot 23 is adapted to receive a locking tongue of a holder component (such as 30), whereas apertures 21' and 22' and slot 23' are adapted to receive the hinge lugs and locking tongue of a pen rack component, in the example illustrated. It is to be understood that each of the panel areas is provided with a similar set of ports and slots so that each panel area may be caused to hold a suitable holding component or pen rack component either adjacent the front surface or the rear surface of the panel area.

Each of the panels may be provided with means for pivotally connecting such panel to the supporting frame. As best seen by reference to FIGS. 2, 3 and 4, the side frames 2 and 2' may be provided with inwardly urged pivot pins 24 and 24' adapted to enter into horizontally aligned recesses formed in the ribs or flanged margins 17 and 17' of the panel, thereby supporting it for pivotal movement about a horizontal axis. Either the lower lip 16" of the flange structure of a panel (or a rearward extension of such lip, or of flange 16) is preferably provided with an elongated slot adapted to slidably receive the end of a crank arm 25 carried by a rod 26 mounted for partial rotation in the top and bottom members 3 and 4 of the supporting frame or carriage. This rod 26 may be provided with an actuating arm so as to impart controlled movement to the panel (and other panels in the assembly) by partial rotation of the rod 26 and its crank arms 25, rotation of the rod being thus transferred into a pivotal motion of the panels upon its horizontal pins or trunnions 24. In locked (dead center) position, the panels are inclined (as shown in FIG. 4), this being termed the pilferproof position.

Figure 8:
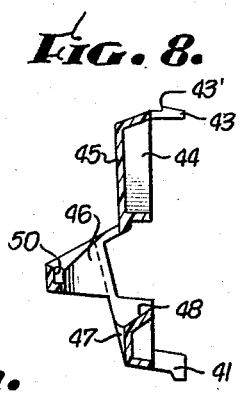
FIGS. 6, 7 and 8 are front views, plan view and vertical section (taken along the plane VIII—VIII of FIG. 6) of a holder for writing instruments, such holder being adapted for use with the panel of FIG. 2.
Figure 5:
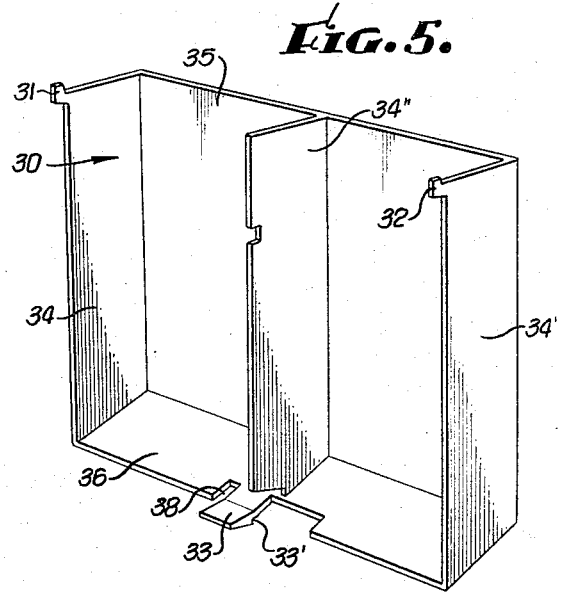
FIG. 5 is a perspective rear view of a holder component adaptable for use with a panel member of the type shown in FIG. 2.
Figure 6:
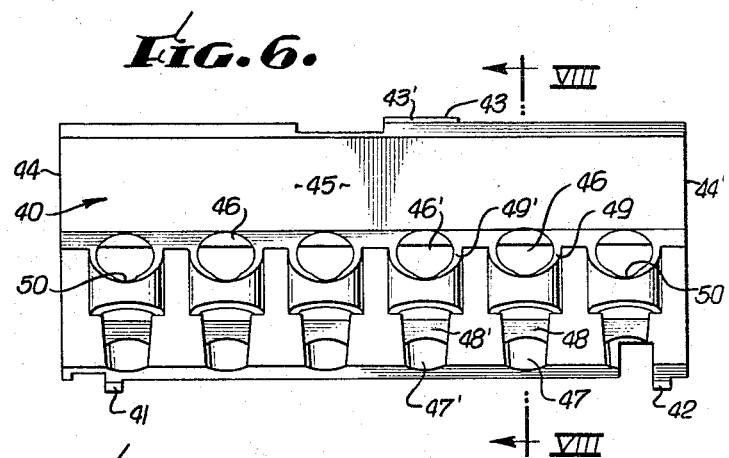
Figure 7:
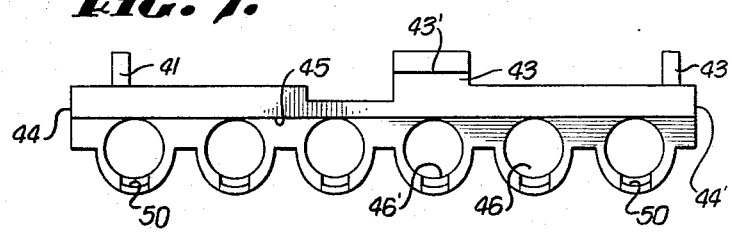

Versatility is imparted to the display assembly by the use of a plurality of holder components such as 30 (FIG. 5) and pen rack components such as 40 (FIGS. 6 to 8). It is to be recognized that the holder components may differ in size, arrangement, etc., and the pen rack components may be or may not be used jointly with holders or separately in a display assembly. Moreover, the precise design of the pen rack components may vary, although the form shown in preferred when writing instruments are to be displayed.

The holder component 30 illustrated in the drawings includes sides 34 and 34', a front 35 and, if desired, a partition 34"; it also includes a bottom 36, but need not have a back. Rearwardly extending hinge lugs 31 and 32 extend from the upper ends of the sides 34 and 34'; a locking tongue 33 extends rearwardly from the bottom 36 and such tongue includes a downwardly extending detent or shoulder 33'. In order to provide sufficient resiliency to the tongue 33, the slot or slots 38 may be formed in the bottom adjacent the tongue. It may be noted that the tongue 33 is laterally displaced toward one side of the holder component and is not as wide as the length of the cooperating slot 23 into which it is to enter; as a matter of fact, the length of the slot 23 should be twice the width of the tongue for reasons which will become apparent from subsequent description.

A plurality of pen rack components 40 is also provided and, as shown by FIGS. 6, 7 and 8, each of these pen rack components also includes sides 44 and 44', a front 45, a pair of rearwardly extending hinge lugs 41 and 42, and a locking tongue 43 provided with a detent 43'. Again, it will be noted that a locking tongue is laterally displaced, has a width not exceeding one-half the width of the slot 23' with which it is to cooperate and the rearwardly extending hinge lugs are also slightly displaced laterally and are narrower than the cooperating apertures 21' and 22'.

From the description given, it will be evident that a holder component 30 may be readily connected to each of the panel areas by inserting the hinge lugs 31 and 32 into the apertures 21 and 22 and then inserting the tongue 33 into the aperture 23, the detent or shoulder 33' then engaging the opposing surface of the panel and holding the holder component in position upon the panel. The side of the holder component cooperates with the adjacent rib defining the margin of the panel area and automatically positions the tongue in the proper portion of the slot 23. The construction described permits a similar holder component 30 to be also attached to the rear surface of the same panel area and again the laterally displaced tongue will automatically position itself within the remaining portion of the slot 23 while the hinge lugs occupy correct positions in apertures 21 and 22 not occupied by the hinge lugs of the component attached to the other side or surface of the panel area.

In order to facilitate the lateral positioning of the article holders, particularly when similar holders such as 30 are attached to front and back of the same panel area (as in FIG. 3), and to prevent the hinge lugs of such opposing holders from clashing, suitably directed lateral guide cams or inclines may be formed adjacent the hinge lug receiving ports 21 and 22. For example, a guide incline 28, lying in a horizontal plane immediately below port 22 and presenting an inclined face extending from rib 18' rearwardly to the front surface 14 of the panel will cooperate with the rear edge of wall 34 of a holder 30 being applied to the front of a panel area. A guide incline 29 extending from the rearward extension of rib 18 toward the rear surface 14' of the same panel area will cooperate with the edge of side wall 34 of a holder 30 being applied to the rear of the panel area. Incline 28 shifts front holders to the left: guide incline 29 shifts rear holders to the right and therefore no clashing occurs when such holders are installed from both sides of a panel area. Angulation, thickness and length of such guide inclines to accomplish the above described result can be varied by workers in the art.

Each of the pen rack components may also be firmly connected to either the front or back surface of the panel area, or to both surfaces; if desired, a holder component may be attached to one surface of a panel area and a pen rack component may be attached to the opposing surface of the same panel area. Again, the hinge lugs 41 and 42 are first engaged in apertures 21' and 22' and the tongue 43 is caused to enter the slot 23'. The sides of the pen rack component are guided by the ribs defining the vertical margins of a panel area so that the tongue 43 assumes the desired position in the slot 23'.

Each of the pen rack components is preferably provided with a plurality of vertically extending parallel spaced passageways, each adapted to receive and hold a writing instrument. In the specific form of pen rack construction illustrated, the passageways such as 46, 46' and the like, are formed by collars which are integral with the body of the rack component. The lower portion of the component may also be recessed, the recesses being in alignment with the passageways as at 47, 47' and the like, these recesses assisting in holding the writing instruments in proper alignment. Each of the recesses may be at the base of a forwardly inclined slide and guide surface such as 48, 48', etc., these surfaces being adapted to initially contact the writing tip of a writing instrument being inserted into a passageway so as to guide the same without damage into proper position. Moreover, a marginal portion of the component, surrounding each of the passageways, may be forwardly inclined as indicated at 49, 49', as taught in Patent 2,987,192. These forwardly inclined marginal surfaces are adapted to contact the lower end of a clip carried by a writing instrument and guide it to the lowermost, forward position so that no matter in which direction a clip faces when the writing instrument is inserted into a passageway, the instrument will come to rest with the clip facing the observer when the instrument is fully in the passageway. The interior surface of the passageway in its frontal portion may be recessed, as indicated at 50, so as to receive the end of a clip and hold it in position facing the prospective purchaser.

Attention is called to the fact that the present invention describes a display device which, in effect, has two effective, operative sides. Each of the panels 10 and each of the panel areas 11, 12, and 13 and both the frontal and the rear surfaces of such panel areas may be caused to hold articles and supplies.

Figure 9A:
Figure 9B:

Although the panel 10 illustrated and described in detail includes three panel areas, other arrangements of angularly related panel areas may be employed. The diagrammatic representation of a horizontal section through a panel having three panel areas (shown in FIG. 9), is similar to that illustrated in FIGS. 1, 2 and 3. However, two angularly related panel areas can be employed as in FIG. 9a or four panel areas may be employed as indicated in FIG. 9b. It is not necessary that these panels be tiltable as hereinbefore described, although tiltable panels employing the pilferproof concepts disclosed in Patent 2,987,192 are preferred. In the locked position illustrated in FIG. 4 hereof, the pens carried in a pen rack cannot be removed by upward, axial movement since the bottom flange of the upper panel (or top frame member 4) prevents removal; but when the obstruction is purposefully removed by operation of crank arm 25 and the panels are tilted forwardly, the articles (such as writing instruments) can be readily pulled up and out of the rack.

Moreover, the horizontal axis of rotation about which these panels may be partially rotated may vary. As indicated in FIG. 9a, the axes of rotation may pass through the panel as indicated by the axis $a-a$, may be behind the panel as indicated by the axis $b-b$, or may be in front of the panel as indicated by the axis $c-c$. Since both sides of each of the panels may be caused to carry articles, the entire display device may be reversed so as to create a different impression. Instead of employing the concave surface as the one to be observed by the prospective customers, the entire device may be reversed and the convex configuration exposed to the eyes of the purchasers.

The various panels and multiple, replaceable components are preferably made of plastic compositions or the like, transparent holder components and pen rack components being most desirable since they permit inspection of all of the cards, printed matter, articles, etc., contained therein.

All changes and modifications coming within the scope of the appended claims are embraced thereby.

We claim:

1. A display assembly including a plurality of components for interengagement in different arrangements whereby displays of different appearance and for different articles may be produced, comprising: a panel including at least two angularly related panel areas, each having a front surface and a rear surface; a flange structure carried by at least one horizontally extending marginal portion of said panel tending to hold said panel areas in fixed angularly related relation to each other; vertical outstanding rib portions delineating vertical margins of each of said panel areas and spacing the same, each panel area including a pair of attachment ports adjacent the ribs delineating said areas, a locking slot located in a plane above said ports, and a locking slot located below said ports; a plurality of backless holder components, each having a front, sides and a bottom, a pair of rearwardly extending, laterally spaced hinge lugs adapted to extend into one pair of spaced attachment ports and a rearwardly extending tongue provided with a detent adapted to extend into a locking slot below said ports; said hinge lugs and tongue being narrower than the cooperating ports and slot and said tongue being laterally displaced toward one side of said holder component whereby a holder component may be attached to the front surface and another to the rear surface of the same panel area by cooperative engagement of said lugs and tongues with the panel adjacent said ports and slot.

2. A display assembly including a plurality of panels as stated in claim 1, a frame support, means mounting each of said panels for pivotal movement about a horizontal axis in such frame, the axes of rotation being above each other, and means for selectively partially rotating said panels from a position wherein the flange structure of an upper panel precludes the removal of an article from a holder component attached to a lower panel to a position in which an article may be removed.

3. A display assembly as stated in claim 1 including a plurality of pen rack components, each provided with a pair of laterally spaced hinged lugs adapted to extend into another pair of attachment ports and a rearwardly extending tongue provided with a detent adapted to extend into a lug slot below said ports; the tongue being laterally displaced toward one end of said rack to position said tongue in a portion only of said slot.

4. A display assembly as stated in claim 3 including a frame support, means mounting each of said panels for pivotal movement about a horizontal axis in such frame, the axes of rotation being above each other, and means for selectively partially rotating said panels from a position wherein the flange structure of an upper panel precludes the removal of a pen carried by a pen rack component attached to a lower panel, to a position in which a pen may be removed.

5. A display assembly including a plurality of components for interengagement in different arrangements whereby displays of different appearance and for different articles may be produced, comprising: a panel including at least two angularly related panel areas, each having a front surface and a rear surface; a flange structure carried by at least one horizontally extending marginal portion of said panel tending to hold said panel areas in fixed angularly related relation to each other; vertical outstanding rib portions delineating vertical margins of each of said panel areas and spacing the same, each panel area including an attachment port adjacent each vertical rib delineating said area, and said attachment ports forming a pair; a locking slot located in a plane above said ports; a plurality of pen rack components each provided with a pair of laterally spaced hinged lugs adapted to extend into a pair of attachment ports and a rearwardly extending tongue provided with a detent adapted to extend into a locking slot above said ports; the tongue being laterally displaced toward one end of said rack to position said tongue in a portion only of said slot; whereby a pen rack component may be attached to the front surface and another to the rear surface of the same panel area through the same pair of ports and slot.

6. A display assembly including a plurality of components for interengagement in different arrangements whereby displays of different appearance and for different articles may be produced, comprising: a panel including at least two angularly related panel areas, each having a front surface and a rear surface; a flange structure carried by at least one horizontally extending marginal portion of said panel tending to hold said panel areas in fixed angularly related relation to each other; vertical outstanding rib portions delineating vertical margins of each of said panel areas and spacing the same, each panel area including an attachment port adjacent each vertical rib delineating said area, and said attachment ports forming a pair; a locking slot located in a plane above said ports; a plurality of pen rack components each provided with a pair of laterally spaced hinged lugs adapted to extend into one pair of attachment ports and a rearwardly extending tongue provided with a detent adapted to extend into a locking slot above said ports; the tongue being laterally displaced toward one end of said rack to position said tongue in a portion only of said slot; whereby a pen rack component may be attached to the front surface and another to the rear surface of the same panel area through the same pair of ports and slot; each pen rack including a face portion provided with a plurality of horizontally spaced, vertical, short passageways, each adapted to freely receive and substantially encircle a section of a writing instrument and support the same by contact with a clip carried by such instrument, and a forwardly and downwardly inclined surface below each of said passageways arranged to contact the end of a writing instrument inserted into a passageway and to guide the instrument into alignment with said passageway.

7. A display assembly as stated in claim 6 including a plurality of backless holder components each having a front, sides and a bottom, a rearwardly extending hinge lug on each of said sides and a tongue provided with a detent extending rearwardly from the bottom; said hinge lugs being adapted to extend into another pair of attachment ports and said tongue into locking engagement with a locking slot below said ports.

8. A display assembly including a plurality of panels and pen rack components as stated in claim 6 including a mounting frame, means for pivotally mounting a plurality of said panels one above the other in said frame and means for simultaneously partially rotating said panels about their horizontal axes into predetermined positions.

9. A display assembly including a plurality of components for interengagement in different arrangement whereby displays of different appearance and for different articles may be produced, comprising: a panel including at least two angularly related panel areas, each having a front surface and a rear surface; a flange structure carried by at least one horizontally extending marginal portion of said panel tending to hold said panel areas in fixed angularly related relation to each other; each panel area including a pair of attachment ports, one port of each pair being adjacent a lateral margin portion of each panel area, and a locking slot located in a plane above said ports; a plurality of backless holder components, each having a front, sides and a bottom, a pair of rearwardly extending, laterally spaced hinge lugs adapted to extend into a pair of spaced attachment ports in a panel area and a rearwardly extending tongue provided with a detent adapted to extend into a locking slot in such panel area.

10. A display assembly as stated in claim 9 wherein the lateral margin portion of a panel area includes a guide adjacent to and inclined toward one of said ports, said guide being adapted to cooperate with a side portion of a holder component to position the tongue of said component in a desired portion of the locking slot.

11. A display assembly as stated in claim 9 wherein the one of said pair of hinge lugs is on each side of said holder component and said locking tongue is carried by the bottom and is laterally displaced.

References Cited by the Examiner
UNITED STATES PATENTS

| | | | |
|---|---|---|---|
| 2,916,156 | 12/1959 | Larson | 211—69 |
| 2,987,192 | 6/1961 | Metzler et al. | 211—4 |

CLAUDE A. LE ROY, *Primary Examiner.*

K. J. WINGERT, *Assistant Examiner.*